United States Patent [19]

Usami

[11] Patent Number: 5,459,521
[45] Date of Patent: Oct. 17, 1995

[54] APPARATUS FOR CONVERTING TELE TEXT DATA FOR DISPLAY ON A 16:9 ASPECT RATIO SCREEN BY CONTROLLING READING AND WRITING SPEEDS OF DATA IN TO A TWO-LINE MEMORY

[75] Inventor: Morio Usami, Tokyo, Japan

[73] Assignee: Sony Corporation, Tokyo, Japan

[21] Appl. No.: 175,519

[22] Filed: Dec. 30, 1993

[30] Foreign Application Priority Data

Jan. 13, 1993 [JP] Japan ................................. 5-003658

[51] Int. Cl.$^6$ ..................................................... H04N 7/01
[52] U.S. Cl. ........................... 348/445; 348/468; 348/556; 348/564
[58] Field of Search ..................... 348/445, 468, 348/556, 564, 563, 553, 555; H04N 7/01

[56] References Cited

U.S. PATENT DOCUMENTS 4,928,182  5/1990  Guerinot et al. .
5,170,256  12/1992  Tabata ........................................ 348/445

FOREIGN PATENT DOCUMENTS 0276985  8/1988  European Pat. Off. .
0393313  4/1989  European Pat. Off. .
0343539  11/1989  European Pat. Off. .
WOA9206562  9/1991  European Pat. Off. .
WO8605644  9/1986  WIPO .

OTHER PUBLICATIONS

Katsumata, et al. (1992) "Development of Picture Converting System Applying An NTSC Signal to A Wide Aspect Display," IEEE Transactions on Cosumer Electronics 38:303–311.

Patent Abstract of Japan, vol. 14, No. 408 (E–097), Sep. 4, 1990 & JP-A-02 152 381 (Sony Corp.) Jun. 12, 1990.

Kinghorn, J. R., (1992) "Enhanced On-Screen Displays for Simpler TV Control," IEEE Transactions on Cosumer Electronics 38:725–733.

Primary Examiner—Victor R. Kostak
Attorney, Agent, or Firm—Jay H. Maioli

[57] ABSTRACT

A teletext signal processing apparatus displays a teletext signal on a display screen at a predetermined aspect ratio. The teletext signal is stored in a memory and is written to and read from the memory at variable speeds. A control circuit commands the memory to operate and adjusts the reading speed with respect to the writing speed, so as to display the teletext signal at the specified aspect ratio.

3 Claims, 2 Drawing Sheets

APPARATUS FOR CONVERTING TELE TEXT DATA FOR DISPLAY ON A 16:9 ASPECT RATIO SCREEN BY CONTROLLING READING AND WRITING SPEEDS OF DATA IN TO A TWO-LINE MEMORY

BACKGROUND OF THE INVENTION

This invention relates to a teletext signal processing apparatus for processing a teletext signal to produce an image on a display screen.

Teletext has been practiced widely in Europe to display characters or the like on a television display screen and carried out on the premise that the display screen has an aspect ratio of 4:3. Although there is no problem with the use of a television employing a display screen having an aspect ratio of 4:3 specified for the teletext, the displayed image will be elongated in the horizontal direction at 4/3 (=¾×16/9) times. The original length with the use of a wide-screen type television such as a high definition television (HDTV) or the like employing a display screen having an aspect ratio of 16:9 (¾×16/9=4/3). Teletext having an aspect ratio of 16:9 may be practiced in the future. With such teletext, the displayed image will be elongated in the vertical direction.

SUMMARY OF THE INVENTION

It is a main object of the invention to provide a teletext signal processing apparatus for processing a teletext signal in such a manner as to produce an image having a roundness of 1 on a television display screen having an aspect ratio different from that specified for the teletext signal.

There is provided, in accordance with the invention, a teletext signal processing apparatus with memory comprising a memory member memorizing a digital signal, and a control member controlling a speed of writing and reading data from/to said memory member whereby the writing speed and the reading speed of the data is different.

In another aspect of the invention, there is provided a method of changing aspect ratio of area of displaying data, comprising the steps of writing data to a memory at a predetermined speed, reading data from said memory at a different speed from said predetermined speed, and a supplying output data of said read data to another circuit.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
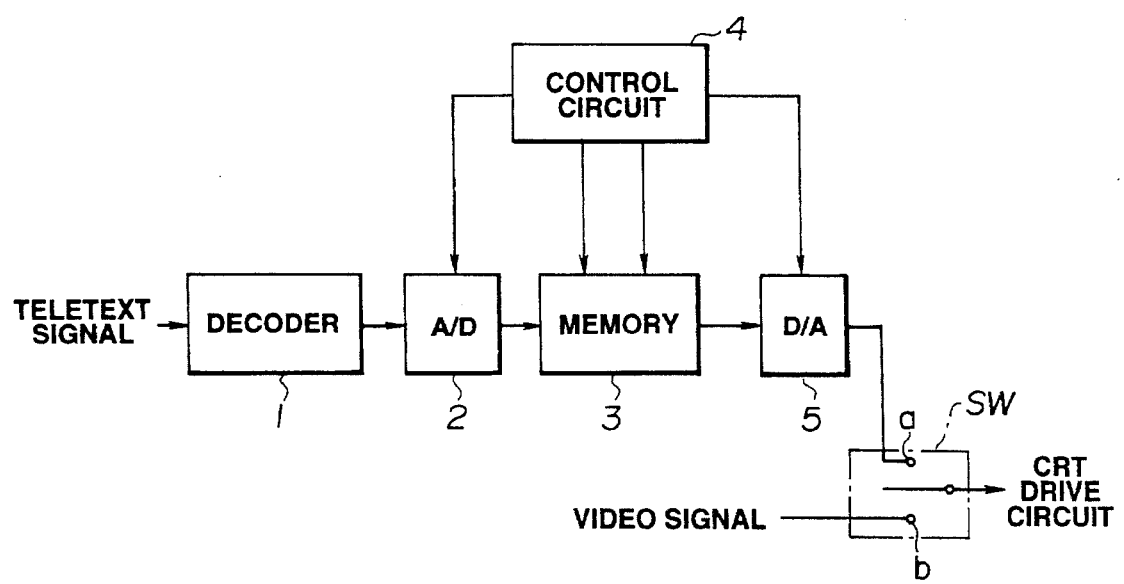
FIG. 1 is a schematic block diagram showing one embodiment of a teletext signal processing apparatus made in accordance with the invention.

With reference to the drawings, and in particular to FIG. 1, there is shown a schematic block diagram of a teletext signal processing apparatus embodying the invention. It is now assumed that a teletext signal having an aspect ratio of 4:3 is displayed on a television employing a display screen having an aspect ratio of 16:9. The teletext signal processing apparatus includes a decoder 1 to which a coded teletext signal is fed. The decoder 1 decodes the received teletext signal into a teletext video signal. The teletext video signal is fed to an analog-to-digital (A/D) converter 2 which converts it into a corresponding teletext digital signal on command from a control circuit 4. The teletext digital signal fed from the A/D converter 2 is written into a memory 3 having a capacity for storing a predetermined number of (for example, two) horizontal lines of teletext video signal. The memory 3 is operable, on command from the control circuit 4, at a variable writing speed where the teletext video signal is written into the memory 3 and at a variable reading speed where the written teletext video signal is read from the memory 3. The teletext video signal read from the memory 3 is fed to a digital-to-analog (D/A) converter 5 which converts it into a corresponding teletext analog signal on command from the control circuit 4. The teletext analog signal is fed from the D/A converter 5 to the first input terminal a of a change-over switch SW. The change-over switch SW has a second input terminal b to which a normal video signal is fed. The change-over switch SW selects one of the teletext video signal and the normal video signal. The selected video signal is fed to a CRT drive circuit.

Figure 2:
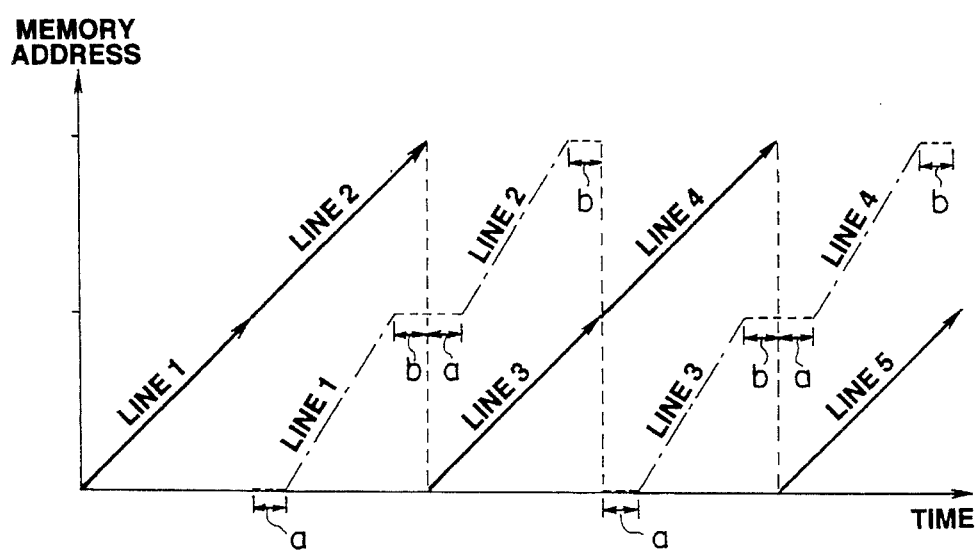
FIG. 2 is a diagram used in explaining the relationship between the time at which a teletext signal is written into the memory and the time at which the written teletext signal is read from the memory.

The control circuit 4 controls the reading speed of the memory 3 at 4/3 times of the writing speed of the memory 3. Assuming now that the frequency of the writing clock pulse signal is $4f_{SC}$ where $f_{SC}$ is the frequency of the chroma sub-carrier signal and $f_{SC}$=4.43 MHz for PAL, the frequency of the reading clock pulse signal may be set at $16/3 \times f_{SC}$. As a result, the time at which the memory 3 starts reading for each line of teletext video signal is delayed in time relative to the normal starting time, as shown in FIG. 2 where the solid lines indicate times at which the teletext signal is written into the memory 3 and the one-dotted lines indicate the times at which the written teletext signal is read from the memory 3.

Figure 3A:
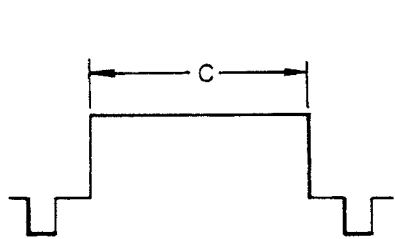
FIG. 3A illustrates a voltage waveform showing the video signal before it is written into the memory.
Figure 3B:
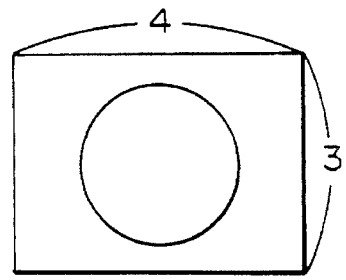
FIG. 3B is a diagram used in explaining an image produced on a display screen having an aspect ratio of 4:3.
Figure 3C:
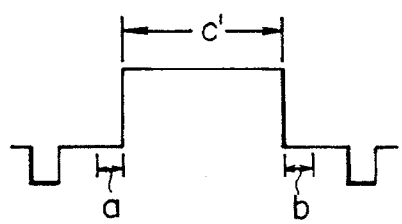
FIG. 3C illustrates a voltage waveform showing the video signal after it is read from the memory.
Figure 3D:
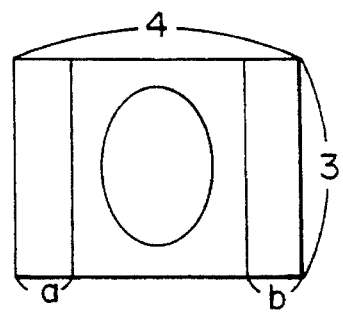
FIG. 3D is a diagram used in explaining an image produced on a display screen having an aspect ratio of 4:3.
Figure 3E:
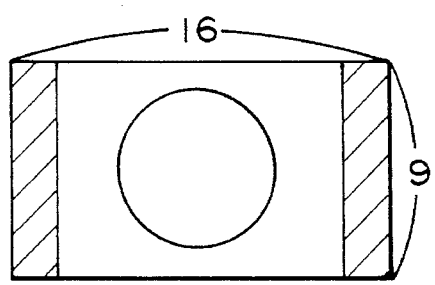
FIG. 3E is a diagram used in explaining an image produced on a display screen having an aspect ratio of 16:9.

The operation of the teletext signal processing apparatus of the invention will be described. FIG. 3A shows the teletext video signal output from the decoder 1. If the teletext video signal is displayed on a display screen having an aspect ratio of 4:3, the produced image will have a roundness of 1, as shown in FIG. 3B. The teletext video signal is written into the memory 3 at a writing speed and is read from the memory 3 at a reading speed equal to 4/3 times of the writing speed. FIG. 3C shows the teletext video signal read from the memory 3. If the read teletext video signal is displayed on the display screen having an aspect ratio of 4:3, the produced image will be elongated in the vertical direction, as shown in FIG. 3D. If the read teletext video signal is displayed on a display screen having an aspect ratio of 16:9, image produced will have a roundness of 1, as shown in FIG. 3E.

Figure 4:
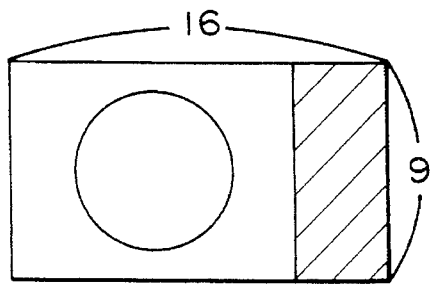
FIG. 4 is a diagram used in explaining an image produced on a display screen having an aspect ratio of 16:9.

In this embodiment, the time at which the teletext video signal is read from the memory 3 for each line of the teletext video signal is delayed by a time interval a so that the produced image is positioned at the center of the display screen. It is to be noted, however, that the produced image may be shifted to the left or right or to one of the corners of the display screen without delaying the time at which the teletext video signal is read from the memory for each line of the teletext video signal, as shown in FIG. 4. This permits effective uses of the hatched area. For example, an operation menu or a normal video signal may be displayed on the hatched area.

Although the above embodiment has been described in connection with the case where a display screen having an aspect ratio of 16:9 is used to display a teletext signal having an aspect ratio of 4:3, it is to be noted that the invention is equally applicable to the cases where the aspect ratio specified for the teletext signal is different from the aspect ratio of the display screen. For example, the display screen may have an aspect ratio of 4:3 to produce an image for the teletext signal having an aspect ratio of 16:9. To use a display screen having an aspect ratio of 4:3 to display a teletext signal having an aspect ratio of 16:9, the teletext video signal may be read from the memory 3 at a speed equal to ¾ times the speed at which the teletext video signal is written into the memory. In greater detail, the signal is expanded with its data being partially thinned.

According to the invention, the writing and reading operation of the memory 3 is controlled in such a manner that the decoded teletext video signal is written in the memory 3 at a writing speed and the written teletext video signal is read from the memory 3 at a reading speed different from the writing speed. As a result, the teletext signal can be displayed at an aspect ratio specified for the teletext signal on the display screen. It is, therefore, possible to display an image having a roundness of 1 even though the aspect ratio specified for the teletext signal is different from the aspect ratio of the display screen. Furthermore, the teletext signal is displayed at a position shifted to the left or right or one of the corners of the display screen. This is desirable for the effective use of the blank area on the display screen.

What is claimed is:

1. A teletext signal processing apparatus for converting teletext data transmitted according to a 4:3 aspect ratio for display on a 16:9 aspect ratio screen, comprising:

a memory having a capacity of two horizontal video scan lines for memorizing a digital teletext signal, whereby teletext data is read from or written to said memory; and a control member controlling a writing speed and reading speed of the data from/to said memory, wherein a ratio of the reading speed of the data to the writing speed of the data is 4/3 and wherein a timing of a start of reading a line of data from said memory is delayed by a period responsive to said ratio from a timing of a start of writing a next line of said data into said memory.

2. A teletext signal processing apparatus as claimed in claim 1, further comprising:

an A/D converter for converting an analog teletext signal to a digital teletext signal for writing into said memory;

a D/A converter for converting a digital teletext signal read out from said memory to an analog teletext signal for display;

a teletext decoder for decoding a modulated analog teletext signal and supplying a decoded signal to said A/D converter; and said control member further controlling a timing of signal converting by said A/D converter and by said D/A converter, respectively.

3. A teletext signal processing apparatus as claimed in claim 2, further comprising an analog switch for switching between an output signal of said D/A converter and another video signal fed thereto.

* * * * *